United States Patent [19]

Weidman

[11] Patent Number: 5,041,713

[45] Date of Patent: Aug. 20, 1991

[54] APPARATUS AND METHOD FOR APPLYING PLASMA FLAME SPRAYED POLYMERS

[75] Inventor: Larry G. Weidman, Fort Myers, Fla.

[73] Assignee: Marinelon, Inc., Fort Meyers, Fla.

[21] Appl. No.: 193,739

[22] Filed: May 13, 1988

[51] Int. Cl.[5] .......................... B23K 9/00; C23C 15/00

[52] U.S. Cl. ............................ 219/121.51; 219/121.5; 219/121.47; 219/121.48; 219/76.16; 427/34; 239/81

[58] Field of Search ...................... 219/121.47, 121.36, 219/121.59, 76.16, 75, 121.51, 121.52, 121.5; 427/34; 239/81, 13

[56] References Cited

U.S. PATENT DOCUMENTS

| | | | |
|---|---|---|---|
| 2,410,225 | 10/1946 | Macht et al. | 117/104 |
| 2,643,955 | 6/1953 | Powers et al. | 427/34 |
| 3,010,009 | 11/1961 | Ducati | 219/75 |
| 3,676,638 | 7/1972 | Stand | 219/76 |
| 3,684,911 | 8/1972 | Perugini et al. | 219/75 |
| 3,740,522 | 6/1973 | Muehlberger | 219/75 |
| 3,823,302 | 7/1974 | Muehlberger | 219/75 |
| 3,892,882 | 7/1975 | Guest et al. | 427/34 |
| 3,914,573 | 10/1975 | Muehlberger | 219/76 |
| 3,962,486 | 6/1976 | Gerek et al. | 427/34 |
| 4,032,744 | 6/1977 | Coucher | 219/74 |
| 4,049,842 | 9/1977 | Gerek et al. | 219/74 |
| 4,121,082 | 10/1978 | Harrington et al. | 219/121.47 |
| 4,125,754 | 11/1978 | Wasserman et al. | 219/121.47 |
| 4,256,779 | 3/1981 | Sokol et al. | 427/34 |
| 4,370,538 | 1/1983 | Browning | 219/121.47 |
| 4,505,945 | 3/1985 | Dubust et al. | 427/8 |
| 4,521,666 | 6/1985 | Severance, Jr. et al. | 219/121.59 |
| 4,596,718 | 6/1986 | Gruner | 219/121.52 |
| 4,625,094 | 9/1986 | Marhic et al. | 219/121.5 |
| 4,642,440 | 2/1987 | Schnackel et al. | 219/121.5 |
| 4,661,682 | 4/1987 | Gruner et al. | 219/121.5 |
| 4,670,290 | 6/1987 | Itoh et al. | 427/34 |
| 4,674,683 | 6/1987 | Fabel | 239/13 |
| 4,675,205 | 6/1987 | Boncoeur et al. | 427/34 |
| 4,683,148 | 7/1987 | Rairden, III | 427/34 |
| 4,694,990 | 1/1983 | Karlsson et al. | 219/121.48 |
| 4,818,837 | 4/1989 | Pfender | 219/121.51 |

OTHER PUBLICATIONS

Metco Type 9MB General Purpose Plasma Spray Gun brochure Metco Inc., 1982.

Plasmatron Owner's Manual, Oct. 1986, Form F905E, Miller Thermal Technologies, Inc., Plasmadyne Division.

Plasmatron Spray System Instruction Manual, Miller Thermal Technologies, Inc. Plasmadyne Division.

Plasmadyne Target Efficiency Plasma Spray Systems, Miller Thermal Technologies, Inc., Plasmadyne Division, brochure.

*Primary Examiner*—M. H. Paschall

*Attorney, Agent, or Firm*—Hovey, Williams, Timmons & Collins

[57] ABSTRACT

An improved, environmentally safe protective coating for marine surfaces is provided which is specially formulated for application to boat hulls for resisting marine growth thereon while minimizing release of toxic antifoulants into the environment. The coatings of the invention can therefore be used on boat hulls for preventing marine growth without the severe pollution effects associated with conventional antifoulant paints. The coatings are preferably made from powdered mixtures which include respective quantities of Nylon 11, an inorganic porous carrier such as carbon black, and an antifoulant such as tributyltin fluoride. Application of the mixture to marine surfaces involves providing a supersonic gas stream, passing the gas stream through an electric arc thereby heating the gas stream and converting a portion thereof to plasma, injecting a quantity of the powdered mixture into the heated gas stream substantially downstream from the arc so as to melt the powder without overheating it, and then spraying the melted mixture onto a surface whereupon it cools and provides a bonded protective coating thereon.

11 Claims, 2 Drawing Sheets

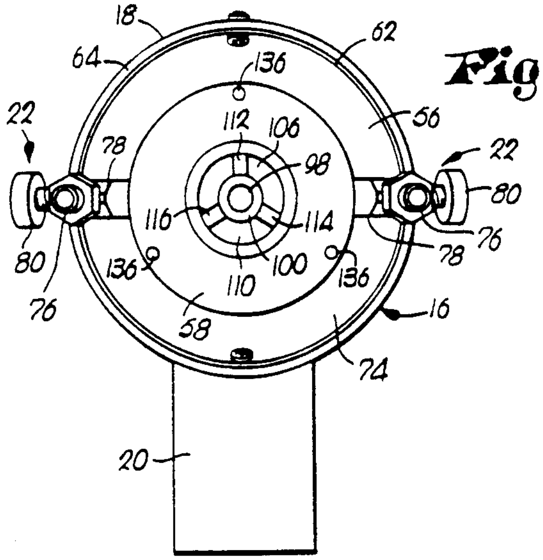
Fig.4.
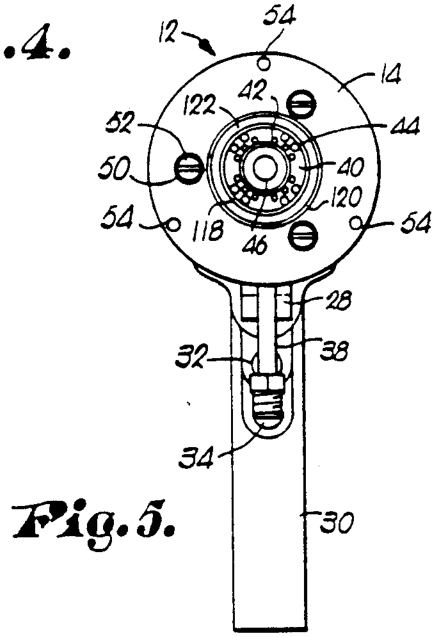
Fig.5.
Fig.6.
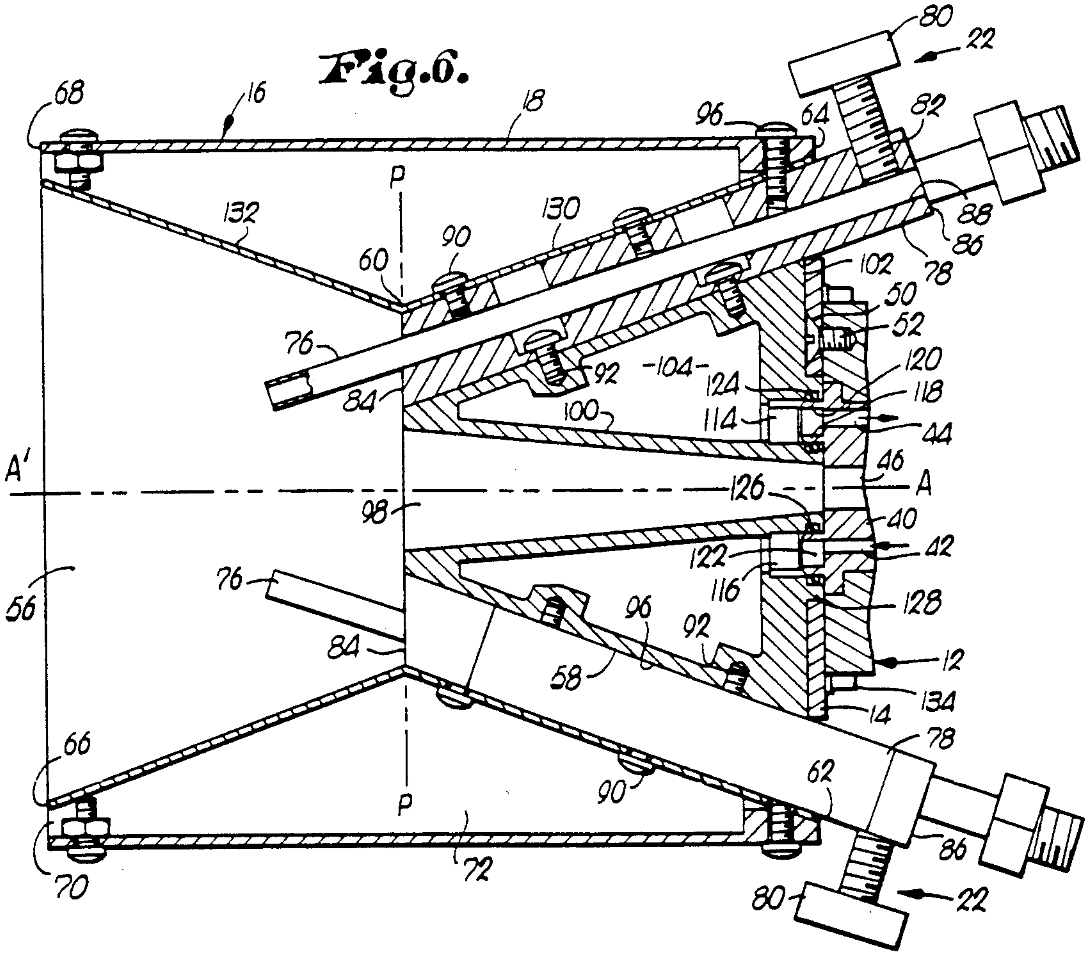

APPARATUS AND METHOD FOR APPLYING PLASMA FLAME SPRAYED POLYMERS

BACKGROUND OF THE INVENTION

1. Field of the Invention

An apparatus for rapidly applying a polymer coating to a variety of surfaces through plasma flame spraying is provided, enabling the user to work in relative safety and achieve a smooth, uniform coating. The apparatus hereof is particularly concerned with a hand-held device for plasma flame spraying a variety of polymers whereby a surface such as wood, fibrous glass reinforced synthetic resin, or even cardboard may be sprayed in close proximity to the front of the barrel of the apparatus without damaging the surface or exposing the operator to potentially toxic fumes resulting from the melted polymer. In its preferred method aspects, the invention involves applying a protective coating to a surface such as a boat hull by providing a electric arc, directing a gas stream through the arc thereby heating the gas stream, injecting a powdered polymer into the gas stream at a location downstream from the arc so as to melt the powder without overheating the same, and then applying the melted mixture to the surface to be coated.

2. Description of the Prior Art

Plasma flame spraying has proven to be a highly efficient and effective method of applying heat fusible materials to a variety of heat resistant surfaces. Plasma is an extremely hot substance consisting of free electrons, positive ions, atoms and molecules. Although it conducts electricity, it is electrically neutral. Plasma is usually generated at temperatures in the vicinity of 15,000 degrees Centigrade by the passage of a gas through an electric arc. In typical plasma spraying systems, a selected inert gas, such as argon or nitrogen, flows between an anode and a cathode. An electrical arc is generated between the anode and cathode, both heating and propelling a heat fusible material carried with the gas. The movement of the gas beween the anode and cathode effectively lengthens the path of the arc, causing more energy to be delivered to the arc. The plasma may issue from the nozzle at subsonic to Mach II speeds, with a flame of intense brightness and heat resembling an open oxy-acetylene flame.

It may be readily appreciated that the intense heat associated with the plasma stream and the rapid flow of the plasma through the gun presents a highly efficient means of melting a heat fusible material and spraying it on a target surface. The plasma flame spray guns previously developed have been principally designed to apply powdered ceramics or metals which have high melting temperatures. These materials are typically injected at or near the arc to achieve the instantaneous melting required when the plasma stream is flowing at sonic or near sonic speeds. Despite the intense heat generated at the arc, the temperature of the plasma gas stream drops rapidly across the intervening distance between the electrode and the target surface. This drop is a function of gas enthalpy, energy absorption by the powdered material, and work distance.

It has become increasingly popular to attempt to apply synthetic polymers by the plasma flame spray method. Flame sprayed polymer powders are lighter in mass and have a much lower melting point than ceramics or metals. As a result, the high temperatures of the arc tend to "burn" the polymers rendering the resulting coating unsuitable. Various plasma spray devices have been developed for use with polymers, such as that of U.S. Pat. No. 3,676,638, which discloses a nozzle whereby powder is fed into the plasma gas stream downstream from the arc. These prior plasma spray devices have been limited in the rate of application due to the low arc power settings necessary to avoid "burning" the polymer, and have had a tendency to produce a somewhat uneven coating with splattering and dangerous and inefficient overspray.

Nonetheless, the durability and density of plasma sprayed polymer coatings have produced a demand for devices which can effectively apply these coatings. In contrast to painted polymer coatings, which require a great deal of surface preparation and wear rapidly, plasma flame sprayed polymer coatings provide a wear-resistant coating of high density with a high bond strength generated as a result of the high velocity impact of the molten composition onto the target surface. In addition, only a nominal amount of grit blasting to slightly roughen the surface and remove any surface contamination is necessary to prepare the surface for plasma flame spraying. However, certain polymer compositions have heretofore been difficult to use in hand held operation because of the toxic fumes released by the molten polymer in the plasma stream. Further, prior apparatus made it difficult to prevent the plasma gas stream from scorching the surface during application. The high heat of the plasma stream in close proximity to the user also posed a safety harzard in the event a plasma gas stream were to be inadvertently directed at the user or another person. Because of the high heat generated by the plasma gas stream, the target surface remained hot after the deposit of the coating, resulting in additional release of toxic fumes into the environment.

SUMMARY OF THE INVENTION

The problems outlined above are in large measure solved by the present invention which provides an apparatus for plasma flame spraying polymers on a variety of target surfaces by providing a cooled, laminar flow plasma gas stream with a minimum of turbulence. The apparatus includes a conventional plasma flame generator and a novel barrel for cooling the plasma gas stream, providing a plasma gas stream having a minimum of turbulence between a nozzle and the target surface, and introducing a polymer in the plasma gas stream.

The invention hereof includes a fluid-cooled plasma flame generator, a barrel, and means for mounting the barrel to the plasma flame generator. The barrel includes a fluid-cooled nozzle through which the plasma gas stream passes upon exiting the plasma flame generator. An open, co-axial airflow area surrounds the nozzle and permits air to flow from the rear of the barrel to the front of the barrel in the same direction and substantially co-axial with the flow of the plasma gas stream. Powder introduction tubes are mounted exterior to the nozzle for introducing polymer, usually in powdered form, into the plasma gas stream downstream from the nozzle.

More particularly, the invention hereof includes a frustoconical shaped nozzle which is provided with a central bore and an interior which is adapted to receive a fluid coolant with a water-cooled plasma flame generator. The nozzle, and the barrel of which it is one component, are mounted to the plasma flame generator by an adaptor plate which permits the exchange of coolant between the generator and the nozzle. The nozzle is thus cooled both by the circulation of coolant on the interior thereof, as well as the flow of air over the exterior surface.

The barrel is provided with an hourglass-shaped interior wall, with the waist of the hourglass-shaped interior wall lying in the same plane as the front end of the nozzle. The posterior margin of the interior wall abuts the posterior margin of the exterior wall to form an air seal therebeween. In contrast, the diameter of the anterior margin of the interior wall is somewhat less than the anterior margin of the exterior wall, defining an annular space therebetween. A vacuum source may be attached to the barrel to both cool the target surface and draw fumes and polymer which has splattered off the target surface into the space between the interior and exterior walls of the barrel to a separate filtering device. Toxic vapors resulting from the melting of particular polymers are thereby captured, maintaining a safe environment for the operator.

Because of the nozzle design and the provision for coaxial flow of air and plasma gas, the plasma gas stream exits the nozzle with a minimum of turbulence and remains substantially laminar as it travels to the target surface. The surrounding air cools the stream and permits the introduction of the polymer outside the nozzle, substantially in the atmosphere. The plasma gas stream is thereby suficiently cooled to enable coating of combustibles such as even cardboard or fibrous glass reinforced plastic at a distance of four inches (10 centimeters). Being able to operate the apparatus so closely to the target surface minimizes the danger to other workers and permits accurate and uniform coating. It also improves the effectiveness of the vacuum in cooling the target surface and preventing vapor and particle loss to the atmosphere, in effect maintaining a separate environment for operation of the apparatus.

The exterior wall of the barrel also acts as a shroud to enclose the open arc, thereby preventing eye burn to the operator or other workers in the vicinity. The absence of a "flame" extending beyond the barrel improves the safety of the device.

One particular polymer composition which may be used in connection with this invention and a method for applying it is shown, for example, in my U.S. Application Ser. No. 07/193,805, now pending filed concurrently herewith and entitled Protective Coating for Boat Hulls and Method of Applying the Same, the disclosure of which is incorporated herein by reference.

These and other advantages will be readily apparent to those skilled in the art from the disclosure recited herein.

BRIEF DESCRIPTION OF THE DRAWING

FIG. 4 is a rear elevational view showing the adapter plate mounted to the nozzle at the rear of the barrel, and a pair of powder introduction tubes for introducing powder into the plasma gas stream;

FIG. 5 is a front elevational view of the fluid cooled plasma flame generator hereof, and in particular a PLASMADYNE Model SG-100 with the cover plate removed to expose coolant exchange ports in the anode, and a control handle coupled thereto; and FIG. 6 is an enlarged, horizontal sectional view along line 6—6 of FIG. 1, showing the nozzle, carrier tubes, coolant circulation path and interior and exterior barrel walls.

DETAILED DESCRIPTION OF THE DRAWINGS

Figure 2:
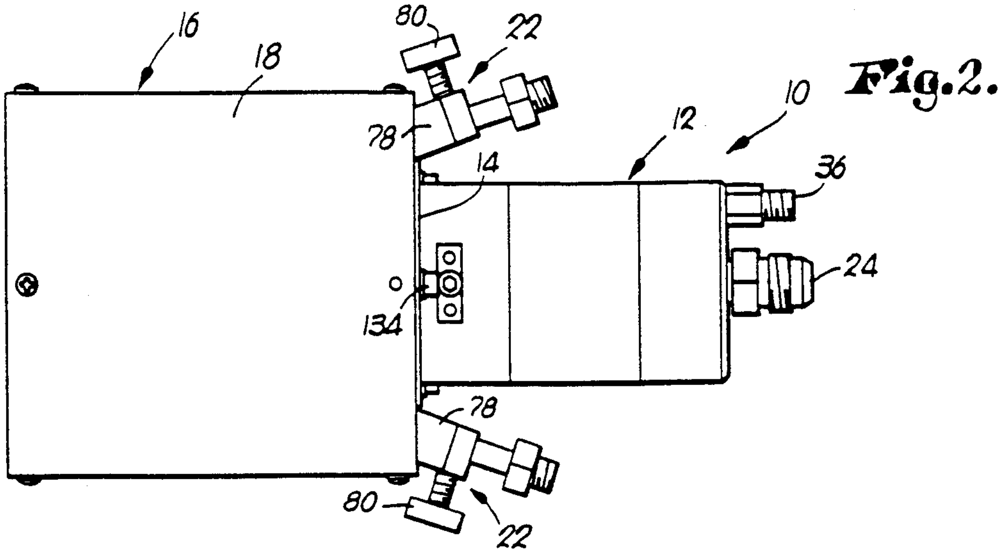
FIG. 2 is a top plan view of the apparatus shown in FIG. 1.
Figure 1:
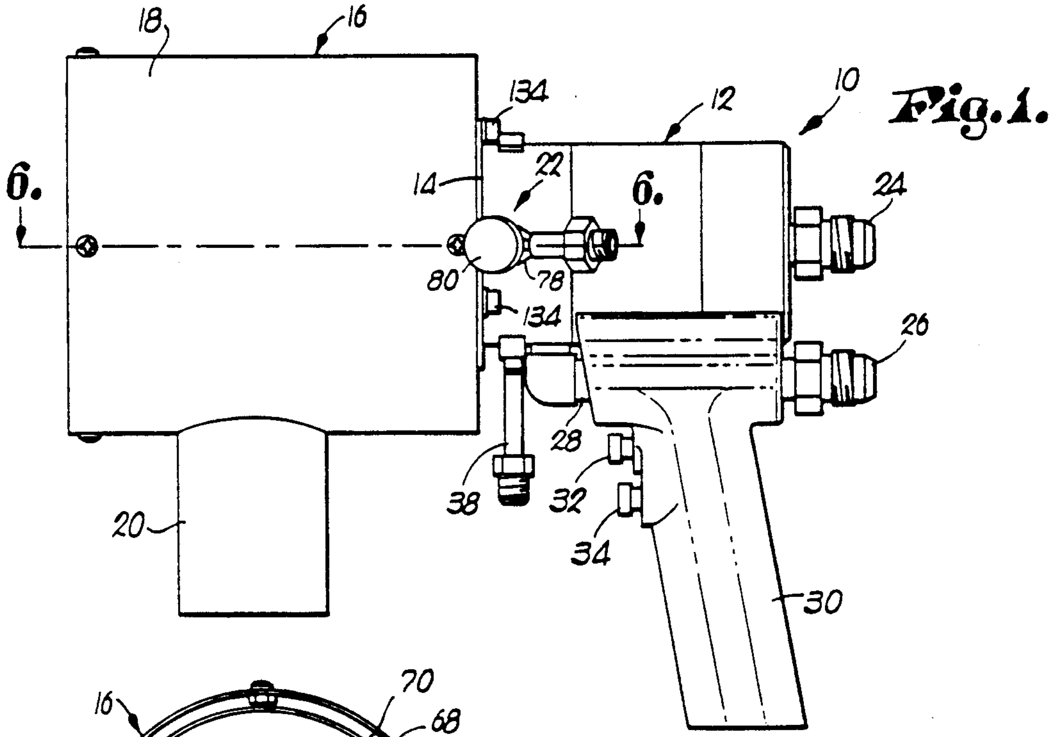
FIG. 1 is a side elevational view of the apparatus for applying plasma flame sprayed polymers.

Referring now to the drawing, an apparatus for applying plasma flame sprayed polymers 10, in accordance with the invention, includes a plasma flame generator 12, adaptor plate 14 and barrel 16. Barrel 16 is provided with a substantially cylindrical outer wall 18, and vacuum connection 20. As shown in FIGS. 1-3, 4 and 6, a pair of carrier block assemblies 22 extend from the posterior of the barrel and are mounted therein.

The plasma flame generator 12 shown and described herein is a PLASMADYNE Model SG-100, which operates at power levels up to 80 kilowatts using argon, argon/hydrogen or argon/helium as the plasma gas. The Model SG-100 is water-cooled, with a water and power inlet connection 24 at the center rear of the generator 12 and a water and power outlet connection 26 located therebeneath. The water and power outlet line 28 extends from the front of the generator rearward through graspable handle 30. Handle 30 is provided with trigger button 32 for initiating the plasma stream, and trigger button 34 for initiation of powder feed. The PLASMADYNE Model SG-100 is further provided with a plasma gas connection 36 for connection with the argon, argon/hydrogen or argon/helium feed line. Powder tube 38 extends beneath the generator for passage of powder near the electrodes within the generator for use of the apparatus with ceramic or metallic powders.

The conventional PLASMADYNE Model SG-100 is provided with a cover plate for preventing the escape of cooling water which circulates through the generator and particularly the anode 40, as shown in FIG. 5. A series of water supply ports 42 provide a flow of water in a path toward barrel 16, while a series of larger water return ports 44 carry the water coolant toward the water and power outlet line 28, the water coolant carrying excess heat generated by the arc. In the center of the copper anode 40, a plasma orifice 46 permits the plasma gas stream to exit the generator and enter the barrel 16.

Barrel 16 is joined to generator 12 by adaptor plate 14. Adaptor plate 14 is in the nature of a flat, annular copper disc provided with a central opening 48 in front of anode 40. The adaptor plate is provided with three equally spaced countersunk holes 50 with mounting screws 52 inserted therethrough into generator 12. A second series of three holes 54 are provided for mounting the barrel 16 to the adaptor plate 14.

Figure 3:
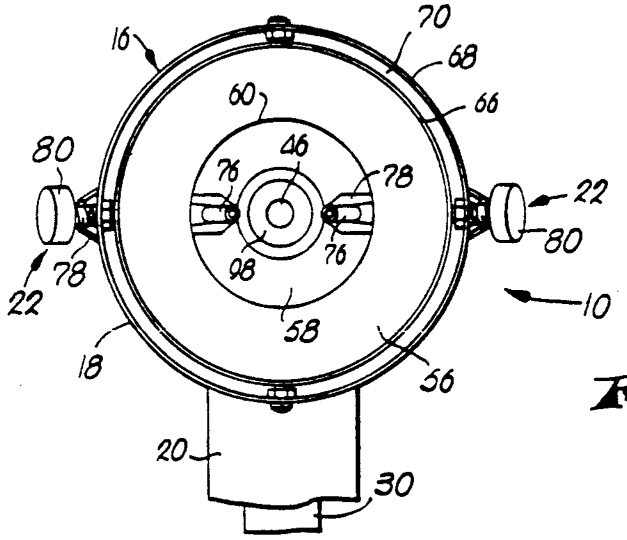
FIG. 3 is a front elevational view showing the annular space between the interior and exterior walls of the barrel.

Referring now to FIGS. 3 and 4, barrel 16 includes outer wall 18, vacuum connection 20, carrier block assembly 22, inner wall 56 and nozzle 58. The inner wall 56 is hourglass-shaped, being composed of two opposed frustoconical members joined at the waist 60 of the houglass shape thereby created. The diameter of the exterior of the posterior margin 62 of the inner wall 56 is substantially the same as the interior diameter of the posterior margin 64 of the outer wall 18, thereby forming an effective fluid-tight air seal between the posterior margin 64 of the outer wall 18 and the posterior margin 62 of the inner wall 56.

In contrast, the outside diameter of the anterior margin 66 of the inner wall 56 is sufficiently less than the inside diameter of the anterior margin 68 of the outer wall 18, thereby defining an annular opening 70 between the inner wall 56 and exterior wall 18. Except at the posterior margins 64 and 62, outer wall 18 and inner wall 56 are spaced apart, defining an airway 72 therebetween. The airway 72 communicates with vacuum connection 20 by an opening in the outer wall 18 at the junction of the vacuum connection 20 and the outer wall 18, for the passage of air drawn therethrough by a vacuum source.

Carrier block assemblies 22 are mounted on opposite sides of barrel 16 between inner wall 56 and nozzle 58. The two carrier block assemblies 22 lie in approximately the same plane as each other, and occupy a portion of the otherwise continuous open coaxial airflow area 74 which substantially surrounds the nozzle 58. Each carrier block assembly includes a copper powder introduction tube 76, a carrier block 78 and a threaded tightening screw 80. As may be seen in FIG. 6, the tightening screws 80 extend through tapped openings 82 in the carrier blocks 78, thereby permitting the tubes 76 to be removed from the carrier blocks 78 but still ensuring that the tubes 76 remain properly positioned during operation.

The carrier blocks 78 are tapered at their anterior ends 84 and posterior ends 86 as shown in FIGS. 3 and 4, thereby minimizing the turbulence of the air as it flows past the carrier blocks 78 into the open coaxial flow area 74. An aperture 88 extends through the carrier blocks 78, each aperture being in the same horizontal plane and the horizontal plane bisecting the nozzle 58. The appertures 88 converge from the posterior of the barrel 16 toward the anterior of the barrel 16, each at an angle from 12 to 20 degrees and preferably 18 degrees from the flow axis A—A' of the plasma gas stream.

As may be seen in FIG. 6, the powder introduction tubes 76 are of a sufficient length that the tubes 76 extend forward of the carrier block 78 and nozzle 58. The front of the nozzle 58, anterior end 84 of the carrier block 78, and waist 60 of the inner wall 56 all lie in the same plane P. Plane P is substantially normal to plasma gas stream flow axis A—A'. Thus, the powder introduction tubes 76 are located exterior to the nozzle 58, extend beyond the nozzle 58, and direct a carrier gas and powdered polymer stream in a direction convergent with the plasma gas flow axis A—A' so that the polymer is introduced through the tubes 76 into the plasma gas stream at a location downstream from the nozzle 58. The plasma gas stream is thus exposed to the atmosphere before intersection with the powdered polymer. The tubes 76 are threaded at their posterior end for connection to a supply line carrying a carrier gas such as nitrogen or argon and a polymer powder.

The carrier blocks 78 are secured by screws 90, 92 to the inner wall 56 and nozzle 58 and thus serve to join the nozzle 58, carrier block assemblies 22, and inner wall 56. Inasmuch as outer wall 18 and inner wall 56 are joined to the carrier block 78 adjacent their posterior margins 64, 62 by screws 96, the nozzle 58, carrier block assemblies 22, inner wall 56 and outer wall 18 substantially form the barrel 16.

The nozzle 58 is a hollow, copper frustoconical member having an exterior jacket surface 96 tapering inwardly with its center along flow axis A—A, The exterior diameter of the exterior jacket 96 decreases along the plasma gas stream flow from A to A', with A being at the posterior of the barrel 16. The inner wall 56 and the exterior jacket 96 define the coaxial airflow area 74 therebetween. The co-axial flow area 74 is substantially annular in cross-section adjacent nozzle 58 and is adapted to communicate air drawn through the open area between nozzle 58 and posterior margin 62 by the plasma gas stream to the open area at the front of the barrel 16.

In contrast, the nozzle 58 is provided with a central bore 98 defined by interior jacket 100 of the nozzle, the diameter of the bore increasing in a direction along the plasma gas stream flow axis from A to A'. The bore 98 is frustoconical in configuration, with the axis of the bore 98 coincident with the plasma gas stream flow axis A—A'. The bore 98 thus tapers outwardly in the direction of the plasma gas stream as defined by the interior jacket 100 of the nozzle 58.

The rear wall 102 of the nozzle 58, together with the exterior jacket 96 and the interior jacket 100 define a substantially open chamber 104 to receive fluid coolant therein. Water flows into the chamber 104 from water supply port 42 in the anode 40 through acesses 106, 108 and 110 at the rear of the nozzle 58. Water or other fluid coolant enters chamber 104, circulates at random and accumulates heat therein, and is forced out through accesses 106, 108 and 110 to water return ports 44 in the anode 40 by additional water furnished through water supply ports 42.

Support arms 112, 114 and 116 interconnect rear wall 102 and interior jacket 100, providing structural rigidity and maintaining the bore 98 in proper alignment. Anode 40 is provided with lips 118 and 120 to provide a channel for the cooling water and enter recessed are 122 to form a seal between the nozzle 58 and anode 40. Silicon rubber O-rings 124, 126 ensure that the seal thus created remains watertight. A raised ring portion 128 of rear wall 102 mates with adaptor ring 14 and anode 40. The difference between the outside diameter of interior jacket 100 and the inside diameter of ring portion 128 defines accesses 106, 108 and 110.

In the preferred embodiment, the upstream frustoconical portion 130 of the inner wall 56 is convergent in the direction of flow of the plasma gas stream along the axis from A to A', at an angle approximately 20 degrees from A—A'. The down-stream frustoconical member 132 of the hourglass-shaped interior wall 56 is divergent in the direction of plasma gas flow along axis from A to A', at an angle of approximately 25 degrees from A—A'. The exterior jacket 96 of the nozzle 58 is convergent in the direction of flow of the plasma gas stream along the axis from A to A' at an angle of 20 degrees from A—A'. The interior jacket 100 of the nozzle 58 is divergent in the direction of flow of the plasma gas stream from A to A' at an angle of 5° from A—A'.

The apparatus is assembled by mounting adaptor plate 14 on generator 12 with screws 52 Barrel 16 is then mounted on adaptor plate 14 by three allen bolts 134 inserted through holes 54 spaced around the exterior of the adaptor plate 14 and threaded into corresponding threaded holes 136 around the exterior of the nozzle 58. Necessary cables and hoses are then connected at the locations corresponding to the fittings described hereinabove.

Polymers may be sprayed utilizing the apparatus described herein by the method described as follows.

A polymer such as nylon is prepared in pelletized forms of a size of approximately 325 mesh (120 microns)

and placed in a powder feeder such as a Plasmatron Model 1251 powder feeder A source of argon or other carrier gas is connected with the powder feeder and then the carrier gas - powder feed line is connected with appropriate fittings to powder introduction tube 76 A second source of gas, also preferably argon, provides the source for the plasma gas and is routed through, for example, a Plasmadyne Model powder feeder and thence to the plasma generator 12, with connections at plasma gas connection 36. Cooling water is supplied from a suitable water source, with additional pressure supplied by a suitable water pump. The water hose is coaxial with a control cable and power supply cable connected at water and power inlet connection 24 by suitable coaxial hoses. The water and power return line returns water from the plasma generator to the heat exchanger. The control cable is routed through a control console, such as a Plasmatron Model 3700, into an auxiliary powder feed control, such as a Plasmatron Model 3700-200. Power is supplied by a suitable source of 40 kilowatt powder, such as a Plasmatron Model PS-61N. Finally, a vacuum source, such as a vacuum pump is connected by a hose to vacuum connection 20. When water, power, plasma gas, carrier gas and powder, and vacuum are supplied to the apparatus, it is ready for operation.

Preferred techniques for applying a polymer coating composition include the steps of providing a high velocity flow (i.e., about Mach I or above) of a gas such as pure argon; passing gas transversely through an elongated high wattage electric arc for heating the gas and converting a portion thereof to the plasma state through plasma generator 12; introducing the powdered coating composition into the gas downstream from nozzle 58 through powder introduction tubes 76 for melting the powder without overheating the powder; directing the flow of the coating composition and associated gas into substantially one direction for minimizing overspray and misting of the composition; and spraying said melted composition onto a target surface to be coated.

In a more preferred method, the plasma gas stream exits a nozzle 58 and draws with it air provided from an open, co-axial flow area 74 prior to the introduction of the polymer composition into the plasma gas stream. More preferably, the powdered composition is introduced into the gas stream in a downstream direction and at an angle from about 12 to 20 degrees to the direction of flow of the plasma gas stream from A to A'; and most preferably the powdered composition is injected in a downstream direction at an angle of about 18 degrees to that of the plasma gas stream so as to minimize vortex formation within the stream and minimize the overspray associated with vortex formation. Also more preferably, the powder is injected at a distance of about 6 to 10 inches downstream from the arc (the arc being defined as the point of energy transfer between an anode and a cathode) so as to minimize overheating of the composition and so as to insure that the composition reaches maximum velocity for a corresponding maximum bond strength with the surface to be coated; and more preferably, injecting the composition into the gas stream at a location of about from 8.5 to 9 inches downstream from the arc so as to achieve the proper molten state of the composition and a particle velocity favoring inner atomic bonding of the composition with the surface to be coated.

If injection of the powdered composition is made either through a high wattage arc or closely adjacent thereto, the composition will be overheated and rendered useless. If a lower wattage arc is employed so as to generate a temperature low enough to permit injection of the powder either through the arc or adjacent thereto, then the application rate permitted by the arc will be so low as to make large scale application economically infeasible. Thus, introduction of the powdered composition substantially downstream from the arc is advantageous to achieve an economically feasible, high volumetric rate application technique. Also, injection of the powder downstream from the arc permits increased arc temperature, which in turn permits adequate heating of increased flows of gas thereby permitting adequate melting and particle velocity for increased powder flow rates. Yet further, the higher arc temperature and injection of the polymer powder downstream from the nozzle enables the simultaneous spraying of polymers and ceramics or metals when a carrier gas and metal or ceramic powder hose is connected at powder tube 38. To achieve the high volumetric application rates of, for example, polyamide coatings, the arc used in the method of the present invention has a preferred power level of 20 to 40 kilowatts and an associated gas temperature at the arc of approximately 12,000 to 30,000 degrees Fahrenheit. More preferably, the arc has a power level of 28 kilowatts and an associated gas temperature at the arc of approximately 22,500° Fahrenheit. The plasma gas stream is then cooled by the apparatus 10 hereof so that by the time the plasma gas stream flowing on axis A—A' has reached the junction with the carrier gas and powdered composition exiting from the powder introduction tube 76, the temperature of the plasma gas stream has dropped down to approximately 250 to 800 degrees Fahrenheit while travelling at 5,000 to 7,000 feet per second. Gases useful as plasma gas in this invention include $H_2$, N2, He, Ar and combinations thereof. The coatings made from the use of that apparatus 10 hereof when applied using the application techniques of the present invention provide coatings having application rates, densities and bond strengths substantially greater than that of coatings applied by conventional polyamid application techniques such as fluidized bed dipping, acetyline flame spraying and electrostatic spraying.

The plasma spray method of the present invention further involves vacuuming toxic fumes in the ambient air from a periphery of the plasma gas stream adjacent the surface to be sprayed and into annular opening 70. By vacuuming the toxic fumes, the operator and the surrounding atmosphere are not subject to the toxic fumes generated during heating of certain polymer compositions which would otherwise escape into the atmosphere. Vacuumed gases are oil filtered to remove the toxic gas fumes. The fumes are drawn into annular opening 70 and airway 72, then exit the apparatus 10 through vacuum connection 20 into a suitable vacuum hose and eventually to a filtering device to remove the toxic gas fumes and organic acid vapors. The vacuum pulls at a rate of at least 10 inches of water at 85 cubic feet per minute and preferably 150 cubic feet per minute.

The following example sets the preferred preparation of a powdered composition in accordance with the present invention, together with typical steps involved in application of the coating. generator 12 hereof having a power level of 18 kilowatts. The arc substantially heats the gas and causes some of the gas to be converted to the plasma state. This heated stream is then cooled as it moves away from the arc by passing through water cooled anode 40, fluid cooled nozzle 58, and a coaxial flow of air surrounding the plasma gas stream as the mach 1 plasma stream draws air through coaxial airflow area 74. The powdered polymer composition is then injected by use of a pressurized carrier gas such as nitrogen or argon through powder introduction tube 76 as described hereinabove into the heated gas stream at a location about 8.5 inches downstream from the arc and about 6 inches downstream from the rear wall of the nozzle, and at an angle of about 18 degrees to that of the general flow of the plasma gas stream along flow axis A—A'. The polymer composition and the plasma gas stream then combine to properly melt the composition and impart a substantial velocity onto the melted composition. The gas and composition are then passed further downstream together in a substantially uniform direction so as to minimize overspray and then are sprayed directly onto a target surface such as an aluminum boat hull so as to form a film coating of the composition thereof. The film coating is then allowed to cool and bond with the surface.

I claim:

1. Apparatus for applying plasma flame sprayed polymers, comprising:

means for generating a plasma stream and defining a plasma stream outlet port;

an elongated nozzle operably associated with said generating means for receiving said plasma stream therefrom, said nozzle presenting a plasma stream inlet opening adjacent said generator port, and opposed plasma stream outlet opening, a smoothly tapered diverging bore-defining inner wall surface extending from said inlet opening to said outlet opening, and an outer wall surface;

means for bringing a cooling fluid into contact with said nozzle outer wall surface for indirect cooling of said plasma stream passing through the nozzle;

means for directing streams of cooling gas along mutually converging paths of travel and into direct, intersecting, cooling relationship with said plasma stream after passage thereof out of said nozzle outlet opening;

means for the introduction of polymer into said plasma stream at a point downstream of said nozzle outlet opening, including structure for directing said polymer for convergence thereof with said plasma stream at an angle which is less than ninety degrees relative to the longitudinal axis of the path of travel of said plasma stream; and means for drawing ambient-derived air currents exteriorly of said nozzle and in a direction counter-current to the direction of travel of said plasma stream.

2. An apparatus for applying plasma flame sprayed polymers as set forth in claim 1 wherein means are provided for the circulation of the fluid coolant between the plasma flame generator and the nozzle.

3. An apparatus for applying plasma flamed sprayed polymers as set forth in claim 1, wherein said means for drawing ambient derived air comprises a barrel positioned radially outwardly of said nozzle, said barrel being provided with an inner wall and an outer wall, said walls being spaced apart and defining a first space therebetween, and there being a second space between the inner wall and the nozzle defining said open co-axial flow area.

4. An apparatus for applying plasma flame sprayed polymers as set forth in claim 1, wherein the exterior of the nozzle is tapered toward the downstream end thereof, with the diameter of the exterior of the nozzle decreasing in the direction of flow of the plasma gas stream.

5. An apparatus as set forth in claim 1, wherein the inner wall is constructed of upstream and downstream frustoconical members, said members being joined at a waist to present an hourglass shaped inner wall.

6. An apparatus as set forth in claim 5, wherein said plasma gas stream flows along one axis, the waist of the two frustoconical members defining a plane, said plane being substantially normal to the flow axis of the plasma gas stream.

7. An apparatus as set forth in claim 6, wherein the plane extends across the downstream end of the nozzle.

8. An apparatus as set forth in claim 5, wherein the exterior wall of the barrel is of substantially the same diameter as and is joined together with the posterior margin of the upstream frustoconical member to form a fluid-tight seal therebetween the anterior margin of the downstream frustoconical member and the outer wall defining an annular opening therebetween, said outer wall further including means for connecting a vacuum source thereto.

9. An apparatus for applying plasma flame sprayed polymers as set forth in claim 1 including a plurality of said polymer introduction means, each of said means being oriented so that the axis of said polymer introduction means intersects a flow axis of the plasma gas stream at a point downstream from said nozzle.

10. An apparatus for applying a plasma flame sprayed polymers as set forth in claim 1, wherein said apparatus is provided with means for enabling the simultaneous plasma flame spraying of polymers and powdered ceramics or powdered metals.

11. Apparatus for applying plasma flame sprayed polymers as set forth in claim 1 wherein said means for drawing ambient-derived air currents are oriented for drawing said air current in substantially surrounding relationship to said plasma stream.

* * * * *